US005350652A

United States Patent [19]

Antoniades

[11] Patent Number: 5,350,652

[45] Date of Patent: Sep. 27, 1994

[54] METHOD FOR OPTIMIZING TABULAR GRAIN POPULATION OF SILVER HALIDE PHOTOGRAPHIC EMULSIONS

[75] Inventor: Michael G. Antoniades, Rochester, N.Y.

[73] Assignee: Eastman Kodak Company, Rochester, N.Y.

[21] Appl. No.: 127,383

[22] Filed: Sep. 24, 1993

[51] Int. Cl.$^5$ ....................... G03C 1/015; G01N 21/49

[52] U.S. Cl. ....................................... 430/30; 430/569; 250/222.2; 250/574

[58] Field of Search ............... 250/222.2, 574; 430/30, 430/569

[56] References Cited

U.S. PATENT DOCUMENTS

| | | | |
|---|---|---|---|
| 3,778,275 | 12/1973 | Denk | 430/642 |
| 4,334,013 | 6/1982 | Bergthaller et al. | 430/569 |
| 4,672,218 | 6/1987 | Chrisman et al. | 350/222.2 |
| 4,797,354 | 1/1989 | Saitou et al. | 430/567 |
| 4,801,524 | 1/1989 | Mifune et al. | 430/569 |
| 4,942,120 | 7/1990 | King et al. | 430/567 |
| 4,945,037 | 7/1990 | Saitou | 430/567 |
| 5,035,991 | 7/1991 | Ichikawa et al. | 430/569 |
| 5,068,173 | 11/1991 | Takehara et al. | 430/567 |
| 5,104,785 | 4/1992 | Ichikawa et al. | 430/569 |

FOREIGN PATENT DOCUMENTS

| | | |
|---|---|---|
| 0531736 | 3/1993 | European Pat. Off. . |
| 03116-133 | 5/1991 | Japan . |
| 0-3243943 | 10/1991 | Japan . |

OTHER PUBLICATIONS

Noboru Itoh, "Studies on the Physical Restrainers (I) The Influence of pH on the restraining Power" Jun., 1967, p. 20.

M. G. Antoniades and J. S. Wey, J. Imaging Sci. Technol. 36:517 (1992).

M. G. Antoniades and J. S. Wey, J. Imaging Sci. Technol. 37:272 (1993).

*Primary Examiner*—Charles L. Bowers, Jr.
*Assistant Examiner*—Mark F. Huff
*Attorney, Agent, or Firm*—Paul A. Leipold

[57] ABSTRACT

The invention provides a method of measuring to control silver halide grain formation during nucleation and ripening comprising combining a source of silver ions and a source of halide ions to form a suspension of nucleated particles, removing a portion of said suspension, measuring turbidity of said portion, determining floc size from the turbidity measurement, determining the difference between floc size and individual silver halide nuclei size.

12 Claims, No Drawings

METHOD FOR OPTIMIZING TABULAR GRAIN POPULATION OF SILVER HALIDE PHOTOGRAPHIC EMULSIONS

FIELD OF THE INVENTION

This invention relates to a method of regulating silver halide emulsion formation. It particularly relates to the determination of the tabular silver halide grain population during nucleation and ripening.

BACKGROUND OF THE INVENTION

The formation of tabular silver halide photographic emulsions generally comprises of three main steps. These steps are, as described in U.S. Pat. No. 4,797,354 (Saitou, Urabe and Ozeki, 1989) (a) the nucleation step whereby the conditions are selected to generate mostly doubly twinned nuclei with parallel twin planes, which are suitable for producing tabular grains; (b) the ripening step whereby the conditions are changed to promote the dissolution of any nuclei that are not suitable for forming tabular grains (e.g., multiply twinned nuclei with nonparallel twin planes, singly twinned nuclei, octahedral and cuboctahedral nuclei), so that a high population of tabular crystals is achieved; and (c) the growth step whereby the surviving tabular grain nuclei are grown in size without changing their total number, by adding silver and halide reactants at rates which do not exceed the maximum growth rate as described by Wey and Strong in "Growth Mechanism of AgBr Crystals in Gelatin Solution", Photographic Science and Engineering, Vol. 21, 1977, pp. 14–18.

The nucleation and ripening steps are very important because they determine the final stable number of tabular crystals, and hence the average grain volume per mass of silver reactant added, as well as the tabular grain population of the final emulsion. Of these two steps, the nucleation step is the most critical because the effect of the ripening step is limited to reducing non-tabular grain nuclei.

The final tabular grain population of AgBr emulsions containing small amounts of iodide and/or chloride is consequently, largely dependent on the nucleation step, which can be carried out by the single-jet method, where silver reactant is added to a well-mixed solution of gelatin, or other appropriate peptizer, and halide, or by the double-jet method, where silver and halide reactants are simultaneously added to a well-mixed solution of gelatin, or other appropriate peptizer, at a controlled pBr, as described by Duffin in "Photographic Emulsion Chemistry", Ch. IV, 1966, by Berry in "The Theory of the Photographic Process", Ch. 3, T. H. James (Ed.), 4th Ed. 1977, and by Wey in "Preparation and Properties of Solid State Materials", Vol. 6, Ch. 2, W. R. Wilcox (Ed.), 1981. The nucleation step can also be carried out by a dual-zone process, using a two-reactor system, where the silver reactant, the halide reactant, and gelatin or other appropriate peptizer are first mixed in a continuous reactor and then added to a second semi-batch reactor, which is used in the nucleation step as a holding vessel, and subsequently as a growth vessel, as described in U.S. Pat. No. 5,035,991 (Ichikawa, Ohnishi, Urabe, Kojima and Katoh, 1991) and U.S. Pat. No. 5,104,785 (Ichikawa, Ohnishi, Urabe and Katoh, 1992).

It is well known that there are several factors during the nucleation step that facilitate the formation of a large population of twinned AgBr nuclei which are suitable for growth to tabular crystals. Several of these factors which are important in the double-jet nucleation method are given in U.S. Pat. No. 4,945,037 (Saitou, 1990) col. 12, line 46, to col. 13, line 40, and of these the most important are the gelatin concentration, the rate of agitation in the nucleation vessel, the silver reactant addition rate, the temperature, the pBr, the presence of halides other than bromide, the pH, and the gelatin type.

PROBLEM TO BE SOLVED BY THE INVENTION

In order to determine the effect of all these nucleation factors on the propensity for tabular grain nuclei formation, in the interest of maximizing the morphological purity of the final tabular grain emulsions, the general method is to amplify the resulting stable nuclei through growth and without generating new nuclei (i.e., below the critical growth rate) and to examine the population of tabular grains in the final emulsion. This procedure poses several problems. Firstly, the effect of the nucleation step cannot be distinguished from the effect of the ripening step. Secondly, there is always the possibility of inadvertently producing new nuclei during the growth process, and thus compromising the effectiveness of this procedure. Thirdly, the growth time is generally much longer than the nucleation time, and consequently a relatively long process is used to study a much shorter one. In addition, the manual determination of the tabular grain population is very tedious.

SUMMARY OF THE INVENTION

The object of this invention is to provide a method, whereby the population of grains with tabular morphology in a photographic AgBr emulsion, which is dispersed in gelatin or other appropriate peptizer and which may contain small amounts of iodide and/or chloride can be maximized without growing the crystals but by simply examining the nucleation step.

Another object of this invention is to provide a method that can be used to monitor the formation of the tabular grains during the nucleation step.

These and other objects of the invention are generally accomplished by a method of measuring in order to control silver halide grain formation during nucleation and ripening comprising

- combining a source of silver ions and a source of halide ions to form a suspension of nucleated particles,
- removing a portion of said suspension,
- measuring turbidity of said portion,
- determining floc size from the turbidity measurement,
- determining the difference between floc size and individual silver halide nuclei size. The difference between floc size and nuclei size allows prediction of the percentage of tabular grain population.

ADVANTAGEOUS EFFECT OF THE INVENTION

Since the turbidity measurements are made during the nucleation step they reveal specific information regarding only the nucleation process. In addition, no lengthy growth process is required to determine the tabular grain population. Instead, the information is made available directly and appropriate action may be taken immediately. If the population of tabular grains is too low, the nucleated emulsion may be dumped prior to wasting time and materials by growing the grains. Further, less material needs to be recycled for silver recovery.

DETAILED DESCRIPTION OF THE INVENTION

The invention method can be used as a research tool, as well as a production monitoring tool, and as a tool in scale-up operations. These objects and the determination of fundamental information on nuclei size and nuclei number can be accomplished by measuring the turbidity of appropriately treated samples which are taken from the reaction vessel at appropriate times during nucleation.

As is described below, these turbidity measurements can provide a metric for the extent of nuclei flocculation, which was discovered to be an indicator of the twinning propensity of nuclei and the formation of tabular grains in the presence of gelatin or other peptizers. The term "flocculation" herein refers to the reversible agglomeration of fine silver halide crystals resulting from bridging between the crystals by the gelatin or other peptizing polymers, as described by Kragh in the "Science and Technology of Gelatin", Ch. 4, A. G. Ward and A. Courts (Ed.), 1977. Similarly the term "floc" will refer to the aggregates formed by flocculation.

It is believed that the correlation between flocculation and the formation of tabular grains is because twinning results from the coalescence of fine crystals, which is, in this case, facilitated and attenuated by the flocculation produced by the gelatin or other peptizing polymer.

During the nucleation of silver halide crystals by the reaction of an aqueous silver salt with an aqueous halide salt, a large number of fine silver halide crystals is rapidly generated due to the low solubility of silver halides. The resulting phase change is governed by the supersaturation ratio (the ratio of the dissolved reagents and their solubility at the prevailing conditions) and the surface energy of the crystals, as described by Nielsen in "Kinetics of Precipitation", Ch. 1, 1964. These fine crystals are thermodynamically unstable because of the resulting decrease in surface energy when the particles are aggregated.

The stability of colloids has been extensively studied (see, for example, Adamson "Physical Chemistry of Surfaces", Ch. VI, 2nd Ed., 1967). In silver halide photographic emulsions, gelatin or other polymeric peptizers are added to overcome the inherent instability of the precipitated crystals. However, at low concentrations of gelatin where the same peptizer molecule may interact with two or more silver halide nuclei, flocculation occurs as disclosed by Antoniades and Wey in "Precipitation of Fine AgBr Crystals in a Continuous Reactor: Effect of Gelatin on Agglomeration", Journal of Imaging Science and Technology, Vol. 36, pp. 517-524, 1992 (hereinafter designated as Antoniades and Wey I), and in "Effect of Gelatin on the Agglomeration of Fine AgBr Crystals in Double-Jet Precipitation", Journal of Imaging Science and Technology, Vol. 37, pp. 272-280, 1993 (hereinafter designated as Antoniades and Wey II).

The extent of flocculation caused by the peptizer, as described above, can be quantified by measuring the effective average floc size, $D_f$, and the average individual crystal size, $D_i$, and calculating their difference $\Delta D_f = D_f - D_i$. If there is no significant difference between $D_i$ and $D_f$, then, the nuclei cannot be flocculated. However, if $\Delta D_f$ is large, then, there is significant flocculation.

The above measurements can be made using turbidity at wavelengths in the range of 400 to 900 nm. As shown by Berry in "Effects of Crystal Surface on the Optical Absorption Edge of AgBr", Physical Review, Vol. 153, pp. 989-992, 1967, the light absorbed by the crystals may be neglected as compared to the light scattered by the crystals in this wavelength range and for particle sizes from 20 to 100 nm. In addition, the suspension density of the crystals is relatively low during nucleation, and the wavelength used can be selected so that the particle size is much smaller than the wavelength so that Rayleigh scattering may be assumed and the Rayleigh equation can be used as given by Kerker, in "The Scattering of Light", p. 325, 1969, whereby the effective particle diameter, $D_T$, is calculated from $$D_T^3 = \frac{(\tau\lambda/\Phi_v)\lambda_m^4}{4\pi^4\mu^2} \quad (1)$$

In Eq. 1, $\tau\lambda$ is the turbidity at wavelength, $\lambda$, given by $$\tau\lambda = \frac{1}{l}\ln T \quad (2)$$

where l is the path length and T is the transmittance. Also, $\Phi_v$ is the volume fraction of the solid particles, $\lambda_m$ is the wavelength in the medium ($\lambda/n_m$), and $\mu$ is given by $$\mu = \frac{\left(\frac{n_p}{n_m}\right)^2 - 1}{\left(\frac{n_p}{n_m}\right)^2 + 2} \quad (3)$$

where $n_m$ is the refractive index of the medium and $n_p$ is the refractive index of the particles.

In Equation 1, the turbidity, $\tau\lambda$, can be measured by a spectrophotometer, and all other parameters are known, or can be calculated. Therefore, $D_f$, $D_i$, and $\Delta D_f$ can be calculated. These measurements, their significance and their applications are described below in more detail, for the double-jet nucleation process and a continuous nucleation process, but can be analogously applied to any other nucleation process.

Double-Yet Nucleation:

During double-jet nucleation whereby a silver salt and a halide salt are added to a vigorously mixed solution of gelatin or other peptizer, there is initially a generation of a large number of nuclei when the supersaturation ratio exceeds that of a critical level. The nuclei number first increases, then decreases as the supersaturation ratio is relieved by the growth of the nuclei and then remains relatively constant, thus producing a stable number of nuclei. At this point the nucleation step is over and the resulting nuclei may be grown to a larger size without altering their total number, as discussed previously. This mechanism is consistent with the findings of Leubner, Jagannathan, and Wey in "Formation of Silver Bromide Crystals in Double-Jet Precipitation", Photographic Science and Engineering, Vol. 24, pp. 268-272, 1980, of Jagannathan and Wey in "Nucleation Behavior in the Precipitation of a Sparingly Soluble Salt - AgBr", Journal of Crystal Growth, Vol. 73, pp. 73–82, 1985, and of Sugimoto in "The Theory of the Nucleation of Monodisperse Particles in Open Systems and its Application to AgBr Systems", Journal of Colloid and Interface Science, Vol. 150, pp. 208–225, 1992.

In this invention a time is selected in the time-domain where the number of nuclei becomes relatively constant and $D_f$ is obtained by withdrawing a sample from the reaction vessel, measuring the turbidity and calculating the effective floc size from Equation 1. Alternatively, the turbidity can be measured in line, by circulating a small portion of the contents of the reaction vessel through a flow cell. The "time domain, where the number of nuclei becomes relatively constant" referred to above, is the period during nucleation when no additional stable nuclei are generated and all reactants added are consumed by the growth of the existing nuclei. The time domain where the number of nuclei relatively constant is generally from about 10 seconds to about 10 minutes after the beginning of nucleation. In addition, $D_i$ can be obtained by withdrawing a sample from the reaction vessel, appropriately quenching it to eliminate flocculation, measuring turbidity, and calculating the mean particle size from Equation 1. Alternatively, the deflocculation may be done in line by in-line dilution, quenching, and pumping through a flow cell, as discussed above, except that in this case the withdrawn samples cannot be returned to the vessel. Then, the difference $\Delta D_f = D_f - D_i$ is used to provide a measure of the propensity for flocculation, which was found to be an indicator of the propensity for twinning and the formation of tabular grains from the nuclei generated at the conditions used to obtain $\Delta D_f$.

If there is no significant difference between $D_f$ and $D_i$, it is concluded that no reversible aggregation occurred and no flocculation is inferred. However, if $\Delta D_f$ is significant, it is concluded that reversible aggregation occurred, and significant flocculation is inferred. It is found that for the desirable high populations of tabular grains, substantial flocculation must be obtained; that is, $\Delta D_f$ must be higher than 20 nm and preferably higher than 50 nm and most preferably higher than 100 nm. The correlation between the extent of flocculation (i.e., $\Delta D_f$) and twinning propensity (i.e., the tabular grain population obtained) is demonstrated in the examples given below. Once this correlation is established, then, only $\Delta D_f$ needs to be used to optimize tabular grain populations.

In such optimizations as discussed above, uncontrolled coalescence should be avoided, as it may lead to multiply twinned grains which are not suitable for tabular grain formation. As shown in Antoniades and Wey I and II, this occurs when the gelatin-to-silver ratio at the silver reactant introduction point is lower that about 50 g/mole.

Continuous Nucleation:

In this case, nucleation is occurring continuously, and a sample for determining $D_f$ from Equation 1 can be withdrawn and the turbidity measured, at any time after the reactor reaches a steady state. Also, $D_i$ can be determined from Equation 1 by withdrawing a sample from the continuous reactor, quenching it appropriately, and measuring the turbidity. Alternatively, these measurements may be made in line by directing part of the reactor effluent through a flow cell (with in-line dilution and quenching in the case of $D_i$). As above $\Delta D_f$ is then used to indicate the propensity for twinning and the probability of tabular grain formation from the nuclei generated in the reactor at the conditions used to determine $\Delta D_f$. For high populations of tabular grain, $\Delta D_f$ must be higher than 20 nm and preferably higher than 50 nm and most preferably higher than 100 nm.

While the description as set forth that the difference between individual silver halide nuclei size and the floc size is measured by determining both the individual particle size and the floc size, this as a practical matter may not be necessary in production. In the repetitious formation of production runs of silver halide, it will be known what the individual particle size is at a certain point by initial testing. Therefore, after a production process is set, it is merely necessary to determine the flocculated particle size, as the individual particle size will already be known. Therefore, in each instance, the individual particle size need not be determined, as the size may be known from previous nucleation. It usually is true that the individual particle size is so small (about 1–10 nm) that it is a relatively insignificant number in the calculation and may be neglected.

The term "floc" as utilized in this specification is meant to refer to an agglomeration of silver halide nuclei that are reversibly joined together and may be easily separated by a process such as dilution or addition of a deflocculant which adsorbs to the crystal surface and provides steric stabilization. This is in contrast to "coalescence" in which the particles would be joined into an agglomeration so firmly that they are not easily separated. In the formation of tabular silver halide emulsions it has been found that during nucleation, flocculation is desirable, and that emulsions in which flocculation has taken place to form flocs of silver halide nuclei will result in satisfactory tabular grain formation after growth. This is because flocculation produces a controlled amount of coalescence which results in twinning dislocations and the formation of tabular grains. In contrast, uncontrollably coalesced particles (e.g., in the absence of gelatin) will not result in grains useful for commercial photography after growth.

EXAMPLES

The following examples demonstrate the correlation between $\Delta D_f$ as defined and discussed above, and the tabular grain population, and show how $\Delta D_f$ can be used to optimize tabular grain populations. These examples also show the utility of using turbidity to predict and monitor the formation of AgBr tabular grains.

EXAMPLE 1

This example shows the correlation between $\Delta D_f$ and the tabular grain population when the gelatin concentration and silver reactant flow rate during nucleation are varied, at 40° C. and several pBr conditions.

To an agitated 4.8 L solution containing lime processed ossein type gelatin (with a concentration of 2 g/L or 10 g/L) at 40° C., pH 4.5, and a specified pBr (1.5, 2.3, or 4.6), 100 mL of 3 M silver nitrate solution and 100 mL of sodium bromide at a concentration needed to maintain the initial pBr, were added at a constant flow rate (20 mL/min. or 150 mL/min.). The turbidity of the suspension during the precipitation was measured in line, by circulating a small amount of the suspension through a flow cell placed in a spectrophotometer. This measurement provided a means to measure $D_f$ at the end of the precipitation, using Equation 1 as described above. Similar $D_f$ results were obtained by using a wavelength of 430 nm with a flow cell of 1 mm path length and a wavelength of 830 nm with a flow cell of 2 mm path length. The values for $n_m$ at 430 and 830 nm were 1.343 and 1.327, respectively, and incorporate the effect of gelatin in the solution; and the values estimated for $n_p$ at 430 and 830 nm were 2.385 and 2.205, respectively. At the end of the reactant addition, a small sample was withdrawn from the reaction vessel and quenched with 4-hydroxy-6-methyl-1,3,3a, 7-tetraazaindene (TAI) at high pH (>8) and by diluting to a suspension density of 0.03 mol AgBr/L. This procedure readily deflocculated the crystals (if they were flocculated) and greatly restrained Ostwald ripening. The level of TAI used was 350 g/mol AgBr which is much higher than the saturation coverage as given by Padday and Herz in "The Theory of the Photographic Process", Ch. 1-III, T. H. James, Ed., 4th Ed. 1977. This measurement provided $D_i$ at the end of the precipitation using Equation 1. Similar $D_i$ results were obtained by using a wavelength of 430 and 830 nm with a path length of 1 cm, and the same values of $n_m$ and $n_p$ as those given above. Finally, $\Delta D_f$ was calculated from $D_f$-$D_i$ as discussed above.

The twinning propensity for each nucleation carried out in the above experiments was also examined as follows. To an agitated 4.8 L solution containing gelatin (with a concentration of 2 g/l or 10 g/L) at 40° C., pH 4.5, and a specified pBr (1.5, 2.3 or 4.6), 25 mL of 3 M silver nitrate solution and 25 mL of a sodium bromide solution at a concentration needed to maintain the initial pBr were added at a constant flow rate (20 mL/min or 150 mL/min.). The gelatin type used was the same as in the first part of this example, and the agitation rate was also kept the same by monitoring the speed of the mixing device. After nucleation, the gelatin concentration and pBr in each experiment were changed to the same conditions (pBr of 1.5 and 10 g/L gelatin) by dumping a 1 L solution containing the appropriate amount of sodium bromide and gelatin. The temperature was then raised from 40° to 70° C. over 18 min., silver nitrate solution (at constant 20 mL/min. flow rate) was first used until the pBr was raised to 2.0 (10 min.), and then double-jet addition of 1M silver nitrate and sodium bromide solutions (at a linearly increased flow rate of 20 to 100 mL/min. for 30 min) was used at this pBr until 2 moles of AgBr was precipitated. The morphology of the resulting crystals was then determined using a scanning electron microscope, and the tabular grain population of the resulting emulsions was determined. The tabular grain population was then rated as low if the projected area and number of tabular grains were both less than 50%, medium if the projected area of the tabular grains was higher than 50%, but the number of tabular grains was lower than 50%, and high if the projected area and number of tabular grains were both higher than 50%.

The results of $\Delta D_f$ and the tabular grain population for each variation of gelatin concentration and reactant flow rate at the different pBr values used are given in Table I.

TABLE I

Correlation of $\Delta D_f$ and Tabular Grain Population when the Concentration of Regular Gelatin and the Reactant Flow Rate were Varied at 40° C. and Several pBr Conditions.

| Gelatin Conc (g/L) | Reactant Flow Rate (mL/min) | $\Delta D_f$ (nm) | Tabular Grain Population |
|---|---|---|---|
| | pBr 4.6 | | |
| 10 | 150 | —[a] | Low |
| 2 | 150 | 65.9 | High |
| 2 | 20 | —[a] | Low |
| | pBr 2.3 | | |
| 10 | 150 | —[a] | Low |
| 2 | 150 | >100 | High |
| 2 | 20 | 5.4 | Low |
| | pBr 1.5 | | |
| 10 | 150 | —[a] | Low |
| 2 | 150 | >100 | High |
| 2 | 20 | >100 | High |

[a]No statistically significant difference between $D_i$ and $D_f$

EXAMPLE 2

This example shows the correlation between $\Delta D_f$ and the tabular grain population when the nucleation gelatin was replaced with peroxide treated gelatin.

In this example, everything was the same as in Example 1, except the gelatin added to the reactor initially was gelatin that was treated with peroxide as disclosed by Maskasky in U.S. Pat. No. 4,713,320 (1987). The gelatin added at the end of the nucleation step by the dumped solution was the same as that used in Example 1. The results of these experiments are given in Table II.

TABLE II

Correlation of $\Delta D_f$ and Tabular Grain Population when the Concentration of Peroxide Treated Gelatin and the Reactant Flow Rate were Varied at 40° C. and Several pBr Conditions.

| Gelatin Conc (g/L) | Reactant Flow Rate (mL/min) | $\Delta D_f$ (nm) | Tabular Grain Population |
|---|---|---|---|
| | pBr 4.6 | | |
| 10 | 150 | —[a] | Low |
| 2 | 150 | 26.7 | High |
| 2 | 20 | —[a] | Low |
| | pBr 2.3 | | |
| 10 | 150 | —[a] | Low |
| 2 | 150 | >100 | High |
| 2 | 20 | 14.1 | Low |
| | pBr 1.5 | | |
| 10 | 150 | —[a] | Low |
| 2 | 150 | >100 | High |
| 2 | 20 | >100 | High |

[a]No statistically significant difference between $D_i$ and $D_f$

EXAMPLE 3

This example shows the correlation between $\Delta D_f$ and the tabular grain population when the rate of agitation during nucleation was varied.

In this example, everything was the same as in Example 1, except the initial gelatin concentration was 5 g/L, the reactant flow rates during nucleation were 150 mL/min., and the initial pBr was 2.3. For one condition of this experiment the rate of agitation was the same as in Example 1 (herein designated as high), and for the second condition the rate of agitation was decreased by a factor of two (herein designated as low). The results from these experiments are shown in Table III.

TABLE III

Correlation of $\Delta D_f$ and Tabular Grain Population when the Rate of Agitation was Varied

| Rate of Agitation | Reactant Flow Rate (mL/min) | $\Delta D_f$ (nm) | Tabular Grain Population |
|---|---|---|---|
| | pBr 2.3 | | |
| High | 150 | 10 | Low |
| Low | 150 | >50 | High |

EXAMPLE 4

This example shows the correlation between $\Delta D_f$ and the tabular grain population at a higher temperature of 70° C.

In this example everything was identical to Example 1, except the temperature was raised to 70° C. In the second part of the experiment where the nuclei were grown in order to examine the tabular grain population, instead of the temperature ramp from 40° to 70° C., the nuclei were held at 70° C. for 10 min. The results from these experiments are shown in Table IV.

TABLE IV

Correlation of $\Delta D_f$ and Tabular Grain Population when the Concentration of Regular Gelatin and the Reactant Flow Rate were Varied at 70° C. and Several pBr Conditions.

| Gelatin Conc (g/L) | Reactant Flow Rate (mL/min) | $\Delta D_f$ (nm) | Tabular Grain Population |
|---|---|---|---|
| | pBr 4.6 | | |
| 10 | 150 | —[a] | Low |
| 2 | 150 | 4.8 | Medium |
| 2 | 20 | —[a] | Low |
| | pBr 2.3 | | |
| 10 | 150 | —[a] | Low |
| 2 | 150 | 7.8 | Medium |
| 2 | 20 | —[a] | Low |
| | pBr 1.5 | | |
| 10 | 150 | —[a] | Low |
| 2 | 150 | 49.4 | High |
| 2 | 20 | 13.7 | Medium |

[a]No statistically significant difference between $D_i$ and $D_f$

The above examples show that there is a correlation between flocculation and the generation of nuclei that form tabular crystals. This correlation is explained as follows. At conditions of low availability of gelatin or other peptizer, the fine nuclei which are rapidly formed at the silver reactant introduction point are forced to initially share the limited available gelatin through bridging, thus causing flocculation. The flocculation then facilitates further interaction between the crystals which results in controlled coalescence. During coalescence, twinning occurs if there is misalignment of the coalescing [111] faces, and multiple twinning results in the formation of tabular grains as discussed by Mumaw and Haugh in "Silver Halide Precipitation Coalescence Processes", Journal Imaging Science, Vol. 30, pp. 198–209, 1986. Therefore, flocculation (i.e., $\Delta D_f$) is a good predictor of desirable twinning that produces crystals which are suitable for tabular grain formation.

In the absence of gelatin uncontrolled coalescence occurs, thus, producing crystals which are not suitable for the formation of tabular grain emulsions with high aspect ratios and high populations of tabular grains, due to the formation of uncontrolled multiple twinning which results in thicker grains and grains with nonparallel multiple twins. As a result, such a condition, as well as very low gelatin-to-silver ratios below 50 g/mole at the silver reactant introduction point (see Antoniades and Wey I and II), should be avoided. On the other hand, when sufficient gelatin or other peptizer is available at the silver reactant introduction point, the fine crystals produced during nucleation are stabilized by the gelatin or other peptizer, so that no flocculation or coalescence occurs ($\Delta D_f$ below 20 nm), and no significant amount of twinning is obtained.

This mechanism also explains the observed effects of the factors, listed in U.S. Pat. No. 4,945,037 (Saitou, 1990) on the twinning propensity, since the same factors were found to affect flocculation and coalescence, as discussed in Antoniades and Wey I and II. For example, in double-jet nucleation, (1) when the gelatin concentration is increased, flocculation and coalescence are decreased and the probability of twinned crystal plane formation is decreased; (2) when the rate of agitation is increased, flocculation and coalescence are decreased and the probability of twinned crystal formation is decreased; (3) when the rate of silver reactant addition is reduced, flocculation and coalescence are decreased and the probability of twin crystal formation is decreased; and (4) when the temperature during nucleation is increased, flocculation and coalescence are decreased and the probability of twin crystal formation is decreased.

Advantages

In this invention we describe a method for predicting twinning and the formation of tabular crystals, by appropriate turbidity measurements of the AgX suspension during the nucleation step, so that no lengthy growth steps are required to determine the population of tabular crystals. This provides a means of rapidly and efficiently optimizing tabular grain nucleations.

Similar turbidity measurements can be used to monitor twin crystal formation during the precipitation of tabular crystals so that appropriate action may be taken immediately. For example, the turbidity measurements described here for obtaining $D_i$ and $D_f$ can be made in-line (i.e., in-line $\tau\lambda$ measurement for $D_f$, and in-line dilution, quenching, and $\tau\lambda$ measurement for $D_i$). Alternatively, in most cases $D_f >> D_i$ and $\Delta D_f \cong D_f$. Therefore, an in-line measurement of the turbidity during nucleation would yield $D_f$ and, hence, $\Delta D_f$. In such cases, the magnitude of the in-line turbidity would reveal the propensity of twinning. Consequently, corrective action may be taken based on this real time measurement. For instance, if the turbidity is lower than a specific value required for a particular nucleation, then the silver reactant addition rate could be increased, or the mixing intensity could be decreased. Finally, the precipitation may be terminated if a specific turbidity value is not attained, thus significantly reducing waste.

Furthermore, these measurements may be used in scale-up operations. In this case, the turbidity measurements would indicate if all the key nucleation parameters are scaled up properly, thus, accelerating the scale-up process.

The invention has been described in detail with particular reference to preferred embodiments thereof, but it will be understood that variations and modifications, can be effected within the spirit and scope of the invention.

I claim:

1. A method of measuring to control silver halide grain formation during nucleation and ripening comprising combining a source of silver ions and a source of halide ions to form a suspension of nucleated particles, removing a portion of said suspension, treating the removed portion with a defloculant to eliminate floculation, separate flocs into individual nuclei, and allow measurement of nuclei size, measuring turbidity of said portion, determining floc size from the turbidity measurement, and determining the difference between floc size and individual silver halide nuclei size, wherein said difference between floc size and nuclei size is greater than 20 nm to give a high population of tabular grains.

2. The method of claim 1 wherein after measuring turbidity, said portion is returned to said suspension.

3. The method of claim 1 wherein said halide ions comprise bromide.

4. The method of claim 1 wherein said determination of said floc size is made by Rayleigh scattering equation from measured suspension density.

5. The method of claim 1 wherein said difference is greater than 50 nm.

6. The method claim 1 wherein said combining and measuring is carried out as part of a continuous manufacturing process.

7. The method of claim 1 wherein said difference between floc size and nuclei size is greater than 20 nm and the nucleated particles are grown to form tabular grains.

8. A method of measuring to control silver halide grain formation during nucleation and ripening comprising combining a source of silver ions and a source of halide ions to form a suspension of nucleated particles, removing a portion of said suspension, treating the removed portion with a defloculant to eliminate floculation, separate flocs into individual nuclei, and allow measurement of nuclei size, measuring turbidity of said portion, determining floc size from the turbidity measurement, and determining the difference between floc size and individual silver halide nuclei size, wherein said difference between floc size and nuclei size is greater than 100 nm to give a high population of tabular grains.

9. The method of claim 8 wherein after measuring turbidity, said portion is returned to said suspension.

10. The method of claim 8 wherein said determination of said floc size is made by Rayleigh scattering equation from measured suspension density.

11. The method of claim 8 wherein said combining and measuring is carried out as part of a continuous manufacturing process.

12. The method of claim 8 wherein said difference between floc size and nuclei size is greater than 100 nm and the nucleated particles are grown to form tabular grains.

* * * * *